Aug. 21, 1945. G. F. ESSON 2,383,050
MULTIPLE OPERATION TOOL HEAD
Filed June 9, 1943 3 Sheets-Sheet 1
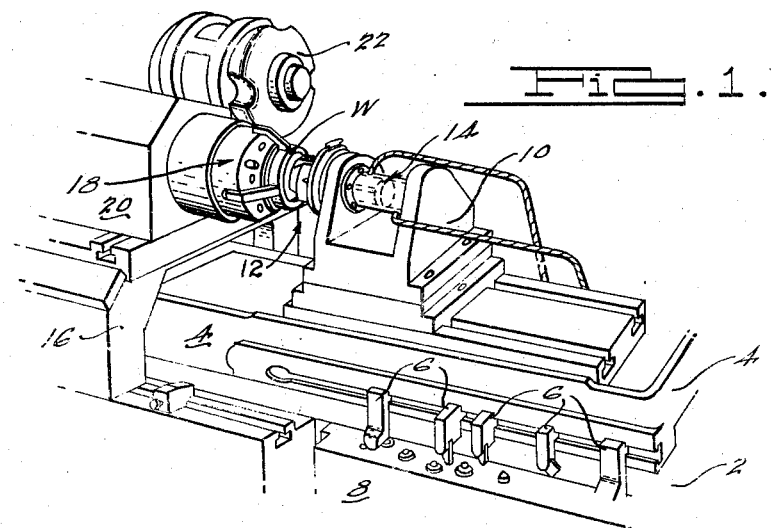
Fig. 1.
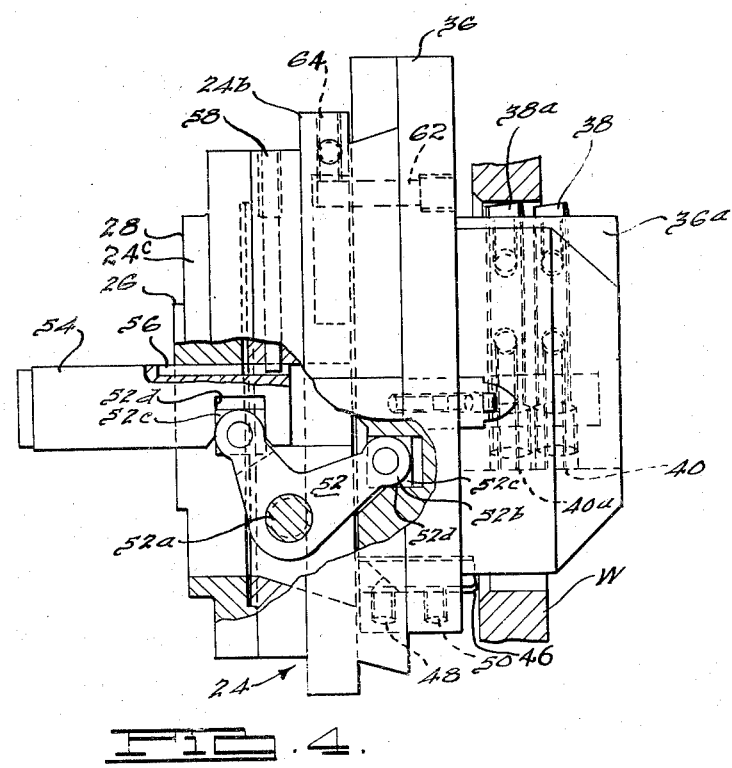
Fig. 4.
INVENTOR.
Gordon Forbes Esson.
BY
ATTORNEY

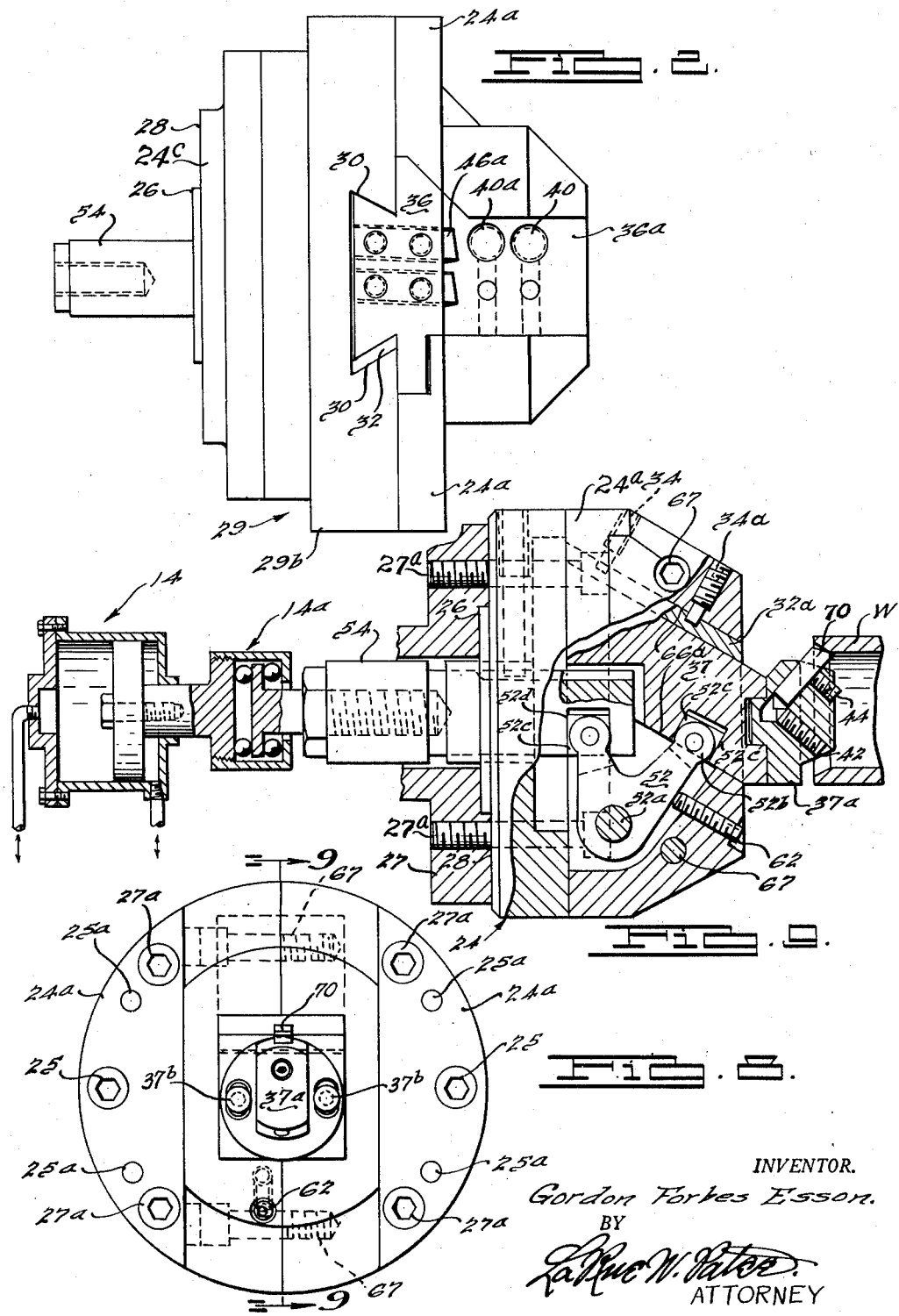

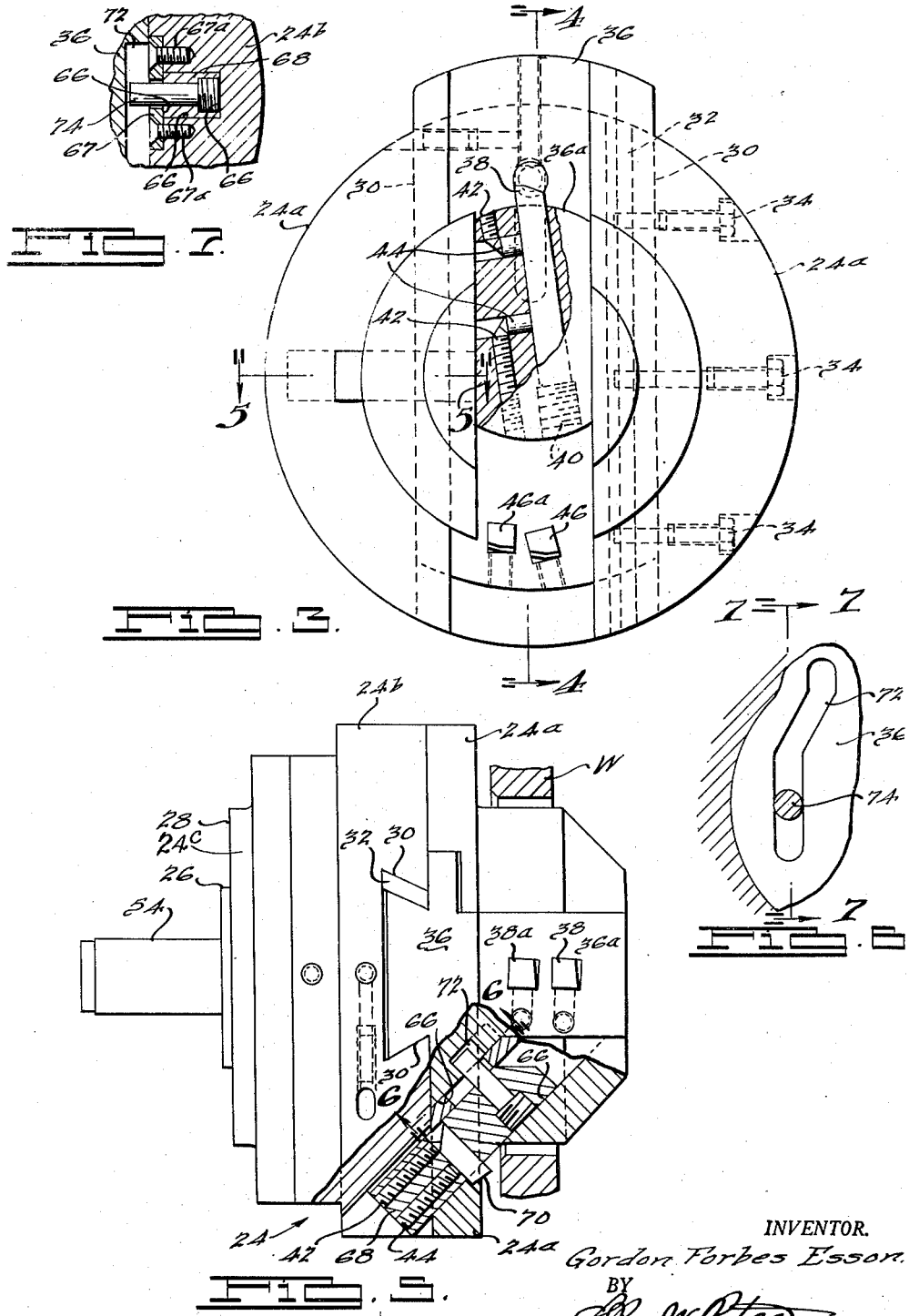

Patented Aug. 21, 1945

2,383,050

UNITED STATES PATENT OFFICE 2,383,050

MULTIPLE OPERATION TOOLHEAD

Gordon Forbes Esson, Detroit, Mich., assignor to Ex-Cell-O Corporation, Detroit, Mich., a corporation of Michigan Application June 9, 1943, Serial No. 490,173

5 Claims. (Cl. 77—58)

This invention relates to a tool head for use with appropriate machines to facilitate performing a multiplicity of machining operations in a predetermined cycle upon an associated workpiece and, as shown in the present embodiment, is adapted for rough and finish boring, rough and finish facing and chamfering of the said bore in the workpiece. One or a multiplicity of such tools may readily be used in a single or multiple spindle machine respectively as required.

The tool is adapted for use with machine tools commonly known as lathes, single or multiple spindle drill presses, boring mills or machines specially constructed for the purpose. Such machines characteristically have a work holding and tool holding means with means for causing relative rotation therebetween with axial movement as while making a facing or cutting off cut and means for imparting relative rotation while moving said tool axially of the work as while performing a boring or turning cut. It is to be understood that the operation of the tool is in no wise affected by rotation of the work in engagement with a non-rotating tool head or vice versa.

Heretofore, machines adapted to perform a multiplicity of operations upon a workpiece such as boring, facing and chamfering have required that the workpiece shall have three distinct and separate locations in relation to the several tools which perform the respective operations. This often requires a separate tool or work rotating spindle for each separate operation performed.

The principal object of my invention is to provide a tool head capable of sequentially and/or simultaneously performing a multiplicity of machining operations on a workpiece including the machining of surfaces of revolution having elements at various angles to the axis of the work, in a single spindle machine tool which is capable of relative rotation and/or axial translation between said spindle and workpiece.

A secondary object is to perform such a multiplicity of operations in a single predetermined cycle of cutting tool movements.

Another object of my invention is to provide a device capable of boring one or a multiplicity of diameters in a workpiece and in the same cycle of machine movements to face in one or a multiplicity of planes at right angles to said bored diameters, a flange surface, or to recess or counterbore a portion of the workpiece.

A further object of my invention is to permit any selected combination of the several operations of boring, turning, facing, counterboring, undercutting, chamfering and cutting off to be accomplished at one workpiece positioning, in a single spindle machine tool.

Still another object is to enable the several surfaces machined by my improved tool head to have an adjustably positionable relation one to another by adjustment of the several included cutting tools but upon fixation of the said tools to cause the relation of the said machined surfaces to have a fixed relation one to another automatically and independently of the exercise of any great thought, care or skill on the part of the machine operator.

A still further object is to enable the generation of surfaces of revolution by simultaneous revolution and axial translation of one, all or any selected ones of the several cutting tools included in my improved tool head to the end that tapered, spherical or less regularly curved surfaces may be generated by components of axial and radial movements of said tools to be simultaneously performed in any controlled rate of movement along such components as may be desirable to generate surfaces of the desired form.

Other objects and advantages will appear with study of the specification and drawings of which:

Fig. 1 is a fragmentary reduced scale perspective view of a machine tool showing one adaptation of my improved tool for machining a workpiece by relative reciprocation and rotation of said tool and workpiece.

Fig. 2 is a side elevational view of the tool head assembly shown in Fig. 1.

Fig. 3 is a front end elevational view, partially in cross section, showing the means for adjustably positioning and locking the boring tools in their adjusted position.

Fig. 4 is an elevational view on lines 4—4 of Fig. 3 shown partially in cross section to disclose the means by which the principal tool supporting cross slide is moved axially of its guideways in response to reciprocation of the power receiving member axial of the tool head body.

Fig. 5 is a side elevational view of the tool head assembly rotated 180° from the view of Fig. 2. The view of Fig. 5 is partially in cross section along line 5—5 of Fig. 3.

Fig. 6 is a fragmentary cross section taken on lines 6—6 of Fig. 5.

Fig. 7 is a fragmentary section taken along line 7—7 of Fig. 6.

Fig. 8 is an end elevational view of a modified form of the invention which contains only one axially movable tool slide adapted for chamfering or forming a conically shaped recess or center on an associated workpiece.

Fig. 9 is a side elevational view of the modification shown in Fig. 8 including a fragmentary cross section along line 9—9 of Fig. 8.

Referring more particularly to the drawings,

Fig. 1 is a partial perspective view of a machine tool adapted to rotationally mount a workpiece and having a sliding tool supporting member adapted to mount my improved tool head structure in axial alignment with the workpiece. By axial movement of said support the tool head structure is brought into and out of cutting association with the rotating workpiece.

In the present instance I have shown a fragmentary portion of the machine tool structure covered by United States Patent No. 2,000,553, issued to Carroll R. Alden, May 7, 1935. This structure includes a base 2 and a hydraulically actuated table structure 4 mounted thereupon and reciprocable thereof. The table 4 is adaptable to move selectively in either direction at rapid traverse or feeding speeds under automatic control of various dog members 6 which coact respectively with control valves shiftable in a hydraulic control panel 8.

The table 4 supports a bracket 10 which supports a tool head structure 12. Supported also on the bracket 10 and extending rightwardly of the tool head 12 is a conventional pneumatic or hydraulic piston and cylinder motor 14 or any suitable alternative means for actuating the movable slides of the tool head 12 which may be connected thereto by an anti-friction thrust bearing means 14—a if desirable. A workpiece W is rotatably supported on an inverted U shaped bridge member 16 the legs of which are supported by the base 2 on either side of and spanning the slidable work table 4. In the present instance a conventional centrifugal work chuck 18 is adapted to be rotatably driven by an associated work spindle 20 by means of an electric motor 22. In the present arrangement the workpiece W is shown rotatably driven without axial reciprocation and the tool head is axially reciprocable without being rotatably driven. However, the converse arrangement is entirely practicable and is preferable if the workpiece be large and unwieldy. In fact if desired the workpiece may be stationarily mounted with respect to the associated machine tool and both movements of rotation and axial reciprocation between the tool head and the workpiece may be imparted to the tool head by the headstock or spindle of the associated machine tool.

The tool head of the present invention includes a composite body part 24 which for convenience of construction includes front plates 24—a, intermediate plates 24—b, and a back plate 24—c. Intermediate plates 24—b, as best shown in Fig. 5, are separated, as along section line 9—9 of Fig. 8, for convenience in machining the rectangularly sectioned slideway 66, the separated plates being joined as one piece after machining by screws 67. The assembly comprising the intermediate plates 24—b and the screws 67 joining them, is fastened to the back plate 24—c by two screws 25 and four dowel pins 25—a, best seen in Fig. 8 and purposely omitted from other views to avoid complications. The back plate 24—c is provided with a pilot or spigot 26 of circular form having its diameter concentric with the axis of the tool head and adapted to locate the tool in a corresponding recess formed within the nose 27 of the machine tool member by which the tool head is supported, which nose is only fragmentarily shown in Fig. 9.

The body part 24 also has a face 28 of annular shape, formed in a plane at right angles to the axis of the tool head adapting the tool body part to be clamped to a corresponding face of the machine tool nose 27 on which the tool head is supported by bolts or screws 27—a of the conventional sort.

The body part 24 is formed with a gibbed slideway 30 of well known construction, adapted to receive a gib 32 adjustable by screws 34 and a cross slide 36 which has a forwardly projecting nose 36—a adapted to receive one or more boring tools illustrated in the present instance by a roughing tool 38 and a finish boring tool 38—a, each of which is adjustable axially in its surrounding recess by means of adjusting screws 40 and 40—a respectively and adaptable to be clamped in adjusted position by conical pointed screws 42 and co-acting locking members 44. Facing tools 46 and 46—a are also mounted in a lateral extension of cross slide 36 and are positioned therein by respective locating and locking screws 48 and 50. The number of such facing tools is determined by the conditions to be met in the facing operation and one or any suitable number of such tools may be used.

The cross slide 36 is adapted to be moved longitudinally of the slideway surface 30 by a bell crank member 52 which has its fulcrum 52—a fixed in the body part 24. The power delivering end 52—b of bell crank 52 is attached to the cross slide member 36 by conventional clevis ends on bell crank 52 in which a rectangular sliding block is pivotally pinned. The sliding blocks 52—c are movable in co-acting rectangular recesses 52—d upon arcuate movement of member 52, and its power receiving end 52—b, is attached to slide 54 by a similar construction. Preferably member 54 is concentric with the axis of rotation of the tool head and slidable in body part 24 and is caused to be fixed angularly therewith by a keyway 56 in engagement with an elongated screw member 58 adjustably fastened in the body part 24 and having its innermost end extending into the keyway 56.

Transverse motion is given to the cross slide 36, by means of axial movement of the member 54 through the interconnecting bell crank 52. Motion may be imparted to member 54 by any conveniently applicable means, such as a hydraulic or pneumatic piston and cylinder motor 14 either manually or automatically controlled or other suitable means for axially moving member 54 such as a manually or power operated rack and pinion or suitable screw and nut means. In the present instance movements of member 54 are transmitted to the power receiving end 52—c of bell crank 52 by similar means to that used for transmitting movement of bell crank 52 to cross slide 36.

To bring the boring tools 38 and 38—a into their active or boring position, member 54 is moved into its leftmost position causing the bell crank member 52 to be moved counterclockwise to its extreme position. This position is determined by an abutment member 62 which is fastened in cross slide 36 and has its innermost end adapted to engage an adjustable stop member 64. The positioning of stop 64 may be used to determine the diameter of the finished bore in the workpiece W.

By means of force applied to the member 54 the cross slide 36 is positioned by abutment 64 while simultaneous rotation and axial translation of the tool head relatively to the workpiece causes the boring tools 38 and 38—a to generate the bore in the workpiece. At the completion of the boring operation, relative translatory movement between the tool head and the workpiece is positively stopped by suitable means, contained in the associated machine tool.

The force applied to the member 54 by the piston and cylinder motor 14 is then reversed at controlled speed causing the cross slide 36 to move transversely of the axis of tool rotation which causes the cutting points of boring tools 38 and 38—a to describe a lesser radius of rotation retracting them from the line of contact with the workpiece preparatory to their withdrawal. This movement brings facing tools 46 and 46—a across the inward end surface of the workpiece in a facing traverse which machines the swept face of the workpiece in a plane normal to the axis of the bore previously formed therein.

Body part 24 is also provided with a slideway 66 for receiving a reciprocatory tool slide 68 in which is mounted a chamfering tool 70 as best seen in Fig. 5. The path of movement of the tool 10 is determined by the angle included between the axis of movement of the tool slide 68 and the axis of rotation of the tool head assembly proper. This angle is chosen to form the desired angular relation between the chamfered edge of the workpiece W and the surfaces bored and faced in the operations previously described.

Motion of the tool slide 68 is simultaneously and automatically accomplished upon movement of the cross slide 36 by means of a slot 72 formed in one edge face thereof for receiving a cross pin 74 which is fixed in the tool slide 68 in such a manner that a traverse motion of slide 36 gives a movement of tool slide 68 axially of its guideway 66.

Figs. 8 and 9 show an alternative form of the invention which is essentially similar to the form of Figs. 2 to 7, inclusive, except that the transverse cross slide 36 is omitted and the angular or chamfer boring slide 68 is replaced by a slide 37 which moves at an angle to the axis of rotation in the guideways 66ª by direct action of the bell crank 52 in a manner which is similar in all essential respects to the drive for slide 36 of Figs. 2 to 7. Corresponding parts are, therefore, identified by the same reference characters. These parts include the body part 24 having the face 28 secured to the tool nose 27 by screws or bolts 27ª, and the screws 67 for joining together the body plates 24ª. A gib 32ª adjustable by a screw 34ª is disposed in the guideway 66ª. In the structure of Figs. 8 and 9, a chamfering tool 70 is supported in a tool carrier head 37ª by conventional adjusting and locking screws 42 and 44 respectively and the head 37ª is fixed to the slide 37 by screws 37ᵇ. A travel limiting screw 62 is effective to predetermine the limit of the travel of bell crank 52 and chamfering tool 70 on the outward stroke of the slide 37. It is to be understood that the alternative form of Figs. 8 and 9 is adapted to perform only the chamfering operation on the workpiece as illustrated by Fig. 9, the boring operations performed by the group of tools 38 and 38ª and the facing operation performed by tools 46 and 46ª of Figs. 2 to 7 being impossible of accomplishment with the alternative form of Figs. 8 and 9.

Summarizing the operation of my improved tool head, in the form illustrated by Figs. 2–7, during the boring of a given diameter the cross slide carrying the boring tool or tools is held in position to give said boring tools their maximum radius of rotation by forces applied to the axially slidable member 54 while a simultaneous movement of rotation and axial traverse between the workpiece and the tool head is occasioned by the associated machine tool.

At the end of the last described boring movement the relative axial traverse between the tool head and the workpiece is discontinued by the associated machine tool without discontinuing the relative rotation. The forces applied by the piston and cylinder motor 14 are then reversed causing the main tool slide 36 and the facing tools carried thereby to traverse the face of the workpiece to be machined in a facing cut. During at least a portion of the last described facing movement of slide 36 the mechanical inter-connection between slides 36 and 68 previously described causes the slide 68 which carries the chamfering tool 70 to pass across the inner edge of the finished bore in the workpiece in a chamfering cut producing a surface of conical form on the workpiece.

At the end of the facing and chamfering movement of the tool head, the boring tools will experience a decreased radius of rotation and the chamfering tool will have an increased radius of rotation. The tool head and workpiece may be separated in an axial movement which is the reverse of the axial traverse by which the boring movement was accomplished. During this separating movement none of the tools will contact the finished surface of the workpiece and, if a rotating tool head is used, the movement of separation may be accomplished without stopping its rotation if desired.

When the tool head has been sufficiently separated from the workpiece, the latter may be removed from the chuck 18, and the piston and cylinder motor 14 may then be caused to return the work head tool slides 36 and 68 to their boring position in preparation for machining of the next succeeding workpiece.

It will be understood that various changes including the size, shape and arrangement of parts may be made without departing from the spirit of my invention and it is not my intention to limit its scope other than by the terms of the appended claims.

I claim as my invention:

1. In a tool head for use with a machine adapted to cause movements of rotation and/or translation between said tool head and a workpiece, a tool slide supporting body having a member movable axially thereof, means for moving said member, a tool supporting cross slide movable in said body at an angle thereto, means connecting said member and cross slide for simultaneous movement relative to said body, a tool carried by said cross slide and adapted when said slide is in a fixed position to cut a predetermined diameter upon said workpiece, and another tool carried by said cross slide and adapted when said cross slide moves relative to said body to generate a face surface on said workpiece at an angle to said diameter, a second cross slide movable in said body at an angle to the first said cross slide and adapted to carry another tool for generating a second surface on the workpiece at an angle to said face surface, and means for moving said second cross slide responsively to movement of said first cross slide.

2. In a tool head for use with a conventional machine tool adapted optionally to rotate and translate the same relatively to a workpiece as in a boring or turning operation and further adapted to rotate the same without said translation as in a facing or cutting off operation, a tool head body formed with a member slidable axially thereof, means for sliding said member relative to said body, a principal tool supporting cross slide translatable in said body and adapted to support a multiplicity of cutting tools, means for causing sliding motion of said member to impart a motion of translation to said cross slide, means for stopping said slide at a predetermined point of its translatory movement, a tool carried by said cross slide for generating a diameter of a workpiece while said slide is stationary relative to said body and said tool head experiences a motion of rotation and translation relatively to said work, a tool carried by said cross slide for generating a face surface on said workpiece while said tool head experiences only a motion of rotation relative to said work and while said cross slide experiences a motion of translation relative to said body, means adapted to move a second cross slide responsively to movement of the first said cross slide and at an angle thereto, and a tool carried by said second cross slide adapted to form on said workpiece a chamfered or conical surface.

3. In a tool head for use with a conventional machine tool adapted optionally to rotate and translate the same relatively to a workpiece as in a boring or turning operation and further adapted to rotate the same without said translation as in a facing or cutting off operation, a tool head body formed with a member slidable axially thereof, means for sliding said member relative to said body, a principal tool supporting cross slide translatable in said body and adapted to support a multiplicity of cutting tools, means for causing sliding motion of said member to impart a motion of translation to said cross slide, means for stopping said slide at a predetermined point of its translatory movement, a tool carried by said cross slide for generating a diameter of a workpiece during the said stopped position of said slide and while said tool head experiences a motion of rotation and translation relatively to said work, a tool carried by said cross slide for generating a face surface on said workpiece while said tool head experiences only a motion of rotation relative to said work and while said cross slide experiences a motion of translation relative to said body, means adapted to move a second tool carrying member responsively to movement of the said cross slide, and a tool carried by said second tool carrying member adapted to generate on said workpiece a surface the elements of which are not parallel to the elements of the surfaces formed either by said diameter generating or said face generating tools.

4. In a tool head for use with a conventional machine tool adapted during a cutting operation on a workpiece alternatively to rotate and translate the same relatively to a workpiece or to rotate said tool head without translating the same relatively to the workpiece, a tool head body, a member slidable axially therein, means for translating said member relatively to said body, a tool supporting member movable relatively to said body, means interconnecting said tool supporting member and said slidable member, means for predetermining at least one extremity of the movement of said tool supporting member, a tool carried by said tool supporting member constructed and arranged to generate a cylindrical diameter of said workpiece when said tool head experiences a motion of rotation and translation relative to said workpiece and while said tool supporting member remains immovable relative to said tool head body, and another tool carried by said tool supporting member constructed and arranged to generate another and non-cylindrical surface on said workpiece during movement from said one extremity of said supporting member relative to said body and while the tool head body experiences a movement of rotation only relative to the workpiece.

5. In a tool head for use with a machine adapted alternatively to cause a movement of rotation or of rotation and axial translation of the tool head relative to the workpiece during performance of cutting operations thereon, a tool slide supporting body having a member slidable axially thereof, means for sliding said member, a tool supporting cross slide movable in said body at an angle to the axis thereof, means connecting said cross slide to said member for simultaneous movement relative to said body in a portion of the cutting operation during which the relative movement between the tool head and the workpiece is one of rotation only, a tool carried by said cross slide and adapted, when said slide is in a fixed position relative to the body and in a portion of the cutting operation during which the relative movement between tool head and workpiece is one of rotation and translation, to generate a cylindrical surface of predetermined diameter upon said workpiece, and another tool carried by said cross slide and adapted, when said cross slide moves, to machine another surface on said workpiece the elements of which latter surface make an angle with the axis of rotation of the tool head.

GORDON FORBES ESSON.